US012589617B2

(12) United States Patent
Aoki et al.

(10) Patent No.: US 12,589,617 B2
(45) Date of Patent: Mar. 31, 2026

(54) RUN FLAT TIRE

(71) Applicant: SUMITOMO RUBBER INDUSTRIES, LTD., Hyogo (JP)

(72) Inventors: Daichi Aoki, Kobe (JP); Hiroki Nakajima, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 550 days.

(21) Appl. No.: 17/759,717

(22) PCT Filed: Feb. 2, 2021

(86) PCT No.: PCT/JP2021/003701
§ 371 (c)(1),
(2) Date: Jul. 28, 2022

(87) PCT Pub. No.: WO2021/157561
PCT Pub. Date: Aug. 12, 2021

(65) Prior Publication Data

US 2023/0084060 A1 Mar. 16, 2023

(30) Foreign Application Priority Data

Feb. 3, 2020 (JP) ................................ 2020-016505

(51) Int. Cl.
*B60C 17/00* (2006.01)
*B60C 1/00* (2006.01)
(Continued)

(52) U.S. Cl.
CPC ............ *B60C 17/0009* (2013.01); *B60C 1/00* (2013.01); *B60C 3/04* (2013.01); *C08K 13/02* (2013.01);
(Continued)

(58) Field of Classification Search
None
See application file for complete search history.

(56) References Cited

U.S. PATENT DOCUMENTS 5,158,627 A 10/1992 Saneto et al.
5,464,899 A 11/1995 Freeman et al.
(Continued)

FOREIGN PATENT DOCUMENTS

CN 101007494 A 8/2007
CN 101873942 A 10/2010
(Continued)

OTHER PUBLICATIONS

An Office Action mailed by China National Intellectual Property Administration on Oct. 19, 2022, which corresponds to Chinese Patent Application No. 202180007516.7 and is related to U.S. Appl. No. 17/759,717; with English language translation.
(Continued)

*Primary Examiner* — Adrienne C. Johnstone
(74) *Attorney, Agent, or Firm* — Studebaker Brackett PLLC

(57) ABSTRACT

Provided is a run flat tire comprising a side reinforcing layer on a sidewall part, wherein a rubber composition of the side reinforcing layer has a complex elastic modulus at 100° C. ($E^*_{100}$) of 5.0 to 17 MPa and a loss tangent at 60° C. (60° C. tan δ) of 0.020 to 0.100 MPa, and wherein, where a tire cross-sectional width is defined as Wt (mm) and a tire outer diameter is defined as Dt (mm), Wt and Dt satisfy any of the following inequality (1), (2), and (3):

$$Wt<225 \text{ and } Dt\geq 59.078\times Wt^{0.460} \quad (1)$$

$$225\leq Wt<235 \text{ and } Dt\geq 59.078\times Wt^{0.620}-967.673 \quad (2)$$

$$235\leq Wt \text{ and } Dt\geq Wt^{0.6}+750 \quad (3)$$

4 Claims, 1 Drawing Sheet

(51) Int. Cl.

| | |
|---|---|
| ***B60C 3/04*** | (2006.01) |
| ***C08K 13/02*** | (2006.01) |
| ***C08L 9/00*** | (2006.01) |
| ***C08L 15/00*** | (2006.01) |
| *C08K 3/04* | (2006.01) |
| *C08K 3/22* | (2006.01) |
| *C08K 3/30* | (2006.01) |
| *C08K 3/36* | (2006.01) |
| *C08K 5/09* | (2006.01) |

(52) U.S. Cl.

CPC ................. *C08L 9/00* (2013.01); *C08L 15/00* (2013.01); *B60C 2001/0033* (2013.01); *B60C 2017/0063* (2013.01); *C08K 3/04* (2013.01); *C08K 2003/2296* (2013.01); *C08K 3/30* (2013.01); *C08K 3/36* (2013.01); *C08K 5/09* (2013.01)

(56) References Cited

U.S. PATENT DOCUMENTS

| | | | |
|---|---|---|---|
| 2007/0169869 | A1 | 7/2007 | Ishida et al. |
| 2011/0005655 | A1 | 1/2011 | Imoto |
| 2014/0034205 | A1 | 2/2014 | Yukawa |
| 2014/0034206 | A1 | 2/2014 | Mizuno |
| 2014/0138003 | A1 | 5/2014 | Kuwayama et al. |
| 2017/0021669 | A1 | 1/2017 | Kuwayama et al. |
| 2017/0297383 | A1 | 10/2017 | Hatanaka et al. |
| 2020/0062933 | A1 * | 2/2020 | Mazzocchia |

FOREIGN PATENT DOCUMENTS

| | | | |
|---|---|---|---|
| CN | 103568730 | A | 2/2014 |
| CN | 106794719 | A | 5/2017 |
| CN | 109438787 | A | 3/2019 |
| EP | 3202596 | A1 | 8/2017 |
| JP | H04-59403 | A | 2/1992 |
| JP | H08-53502 | A | 2/1996 |
| JP | 2007-069775 | A | 3/2007 |
| JP | 2014-031147 | A | 2/2014 |
| JP | 2014-031400 | A | 2/2014 |
| WO | 2012/176476 | A1 | 12/2012 |
| WO | 2015/155992 | A1 | 10/2015 |
| WO | 2018/109661 | A1 | 6/2018 |

OTHER PUBLICATIONS

The extended European search report issued by the European Patent Office on Feb. 1, 2024, which corresponds to European Patent Application No. 21750921.5-1012 and is related to U.S. Appl. No. 17/759,717.

International Search Report issued in PCT/JP2021/003701; mailed Mar. 30, 2021.

Notification of Transmittal of Translation of the International Preliminary Report on Patentability and Translation of Written Opinion of the International Searching Authority; PCT/JP2021/003701; mailed on Aug. 18, 2022.

* cited by examiner

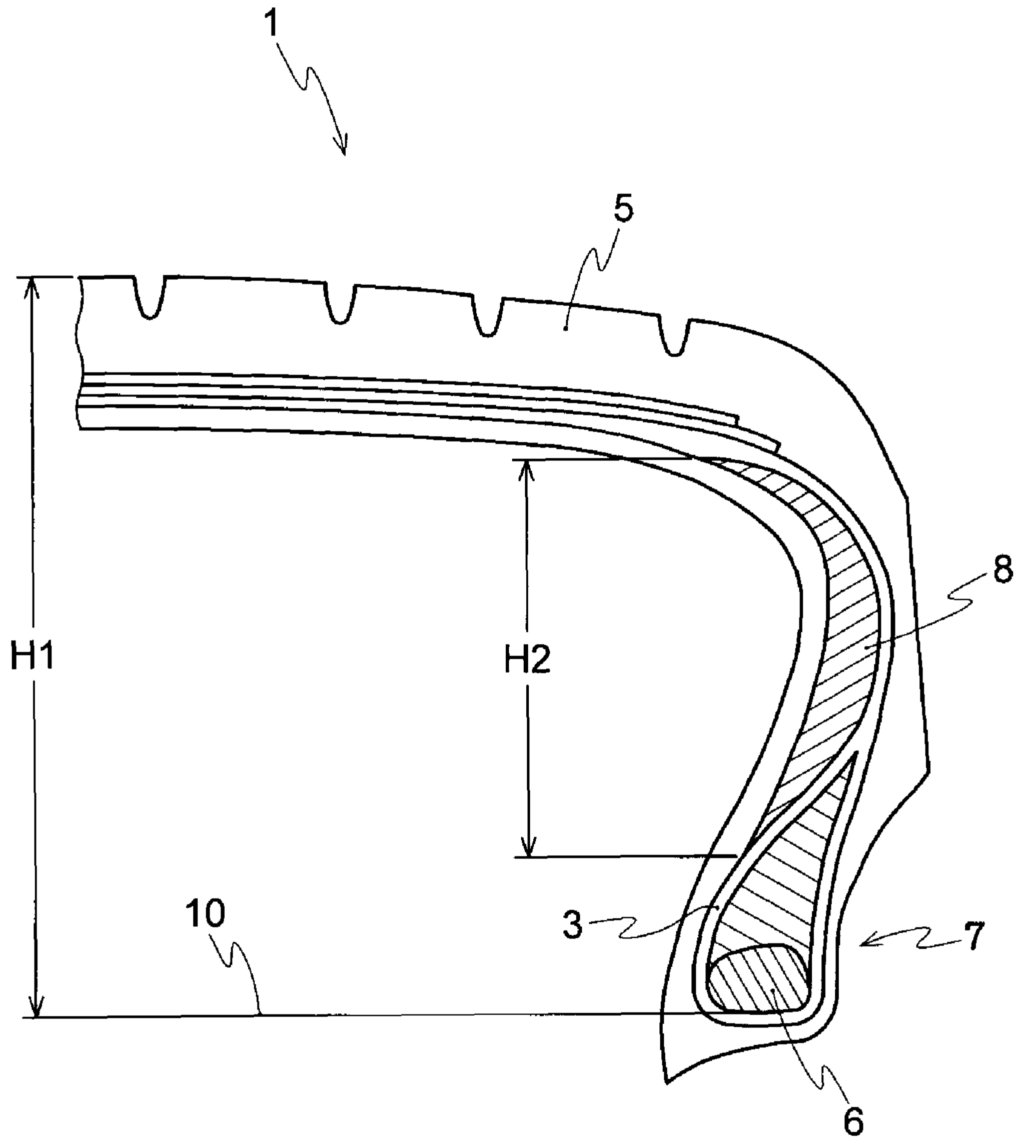
1
5
8
H1
H2
3
7
10
6

RUN FLAT TIRE

TECHNICAL FIELD

The present invention relates to a run flat tire.

BACKGROUND ART

Patent Document 1 discloses a tire having improved fuel efficiency by increasing an outer diameter of the tire with respect to a grounding width of the tire as compared with the conventional tires.

PRIOR ART DOCUMENT

Patent Document

Patent Document 1: WO 2012/176476

SUMMARY OF THE INVENTION

Problem to be Solved by the Invention

However, in the case of diverting the technology for making such tire having a narrow width and a large diameter to a run flat tire, when a tire with a flattening ratio equivalent to that of the conventional tire and an outer diameter close to that of the conventional tire is designed in consideration of space for mounting the tire, a height of a sidewall part with respect to the outer diameter of the tire becomes low, and strain concentrates on the lowered sidewall part, so that there is a concern that satisfactory results cannot be obtained for run flat durability.

On the other hand, when tire cross-sectional widths are made equal, a volume of a side part increases as the outer diameter of the tire increases, and contribution of the side part including a reinforcing layer to rolling resistance increases, and therefore, there is a concern that fuel efficiency may deteriorate.

An object of the present invention is to provide a run flat tire having improved run flat durability and fuel efficiency with a good balance.

Means to Solve the Problem

As a result of intensive studies, the present inventors have found that, in a run flat tire in which a cross-sectional width and an outer diameter of the tire satisfy predetermined requirements, a run flat tire having improved run flat durability and fuel efficiency with a good balance can be obtained by subjecting viscoelasticity of a side reinforcing layer provided in a sidewall part under a specific condition, and completed the present invention.

That is, the present invention relates to:

[1] A run flat tire comprising a side reinforcing layer on a sidewall part, wherein a rubber composition of the side reinforcing layer has a complex elastic modulus at 100° C. ($E^*_{100}$) of 5.0 to 17.0 MPa and a loss tangent at 60° C. (60° C. tan δ) of 0.020 to 0.100, and wherein, where a tire cross-sectional width is defined as Wt (mm) and a tire outer diameter is defined as Dt (mm), Wt and Dt satisfy any of the following inequality (1), (2), and (3):

$$Wt<225 \text{ and } Dt\geq 59.078\times Wt^{0.460} \quad (1)$$

$$225\leq Wt<235 \text{ and } Dt\geq 59.078\times Wt^{0.620}-967.673 \quad (2)$$

$$235\leq Wt \text{ and } Dt\geq Wt^{0.6}+750 \quad (3)$$

[2] The run flat tire of [1] above, wherein the complex elastic modulus at 100° C. ($E^*_{100}$) of the rubber composition is 7.0 to 12.0 MPa,

[3] The run flat tire of [1] or [2] above, wherein the loss tangent at 60° C. (60° C. tan δ) of the rubber composition is 0.025 to 0.070,

[4] The run flat tire of any one of [1] to [3] above, wherein the rubber composition comprises a rubber component comprising an isoprene-based rubber,

[5] The run flat tire of any one of [1] to [4] above, wherein the rubber composition comprises 20 to 60 parts by mass of a reinforcing filler based on 100 parts by mass of the rubber component,

[6] The run flat tire of any one of [1] to [5] above, wherein the rubber composition comprises an organic cross-linking agent,

[7] The run flat tire of any one of [1] to [6] above, wherein a ratio of the loss tangent at 60° C. (60° C. tan δ) of the rubber composition to the tire cross-sectional width Wt (mm) (60° C. tan δ/Wt) is less than $4.5\times10^{-4}$.

Effects of the Invention

The run flat tire of the present invention, in which a cross-sectional width and an outer diameter of the tire satisfy predetermined requirements and viscoelasticity of a side reinforcing layer provided in a sidewall part is subjected under a specific condition, has improved run flat durability and fuel efficiency with a good balance.

BRIEF DESCRIPTION OF THE DRAWINGS

FIG. 1 is a cross-sectional view showing a configuration of the run flat tire of the present disclosure.

EMBODIMENT FOR CARRYING OUT THE INVENTION

In the run flat tire of the present disclosure, where a tire cross-sectional width is defined as Wt (mm) and a tire outer diameter is defined as Dt (mm), Wt and Dt satisfy any of the following inequality (1), (2), and (3):

$$Wt<225 \text{ and } Dt\geq 59.078\times Wt^{0.460} \quad (1)$$

$$225\leq Wt<235 \text{ and } Dt\geq 59.078\times Wt^{0.620}-967.673 \quad (2)$$

$$235\leq Wt \text{ and } Dt\geq Wt^{0.6}+750 \quad (3)$$

In a run flat tire with a narrow width and a large diameter satisfying the above-described relational expression, by setting a complex elastic modulus at 100° C. ($E^*_{100}$) of the rubber composition of the side reinforcing layer to 5.0 to 17.0 MPa and setting a loss tangent at 60° C. (60° C. tan δ) to 0.020 to 0.100, the obtained run flat tire has improved run flat durability and fuel efficiency with a good balance. The reason is not intended to be bound by theory, but can be considered as follows.

With the complex elastic modulus at 100° C. ($E^*_{100}$) and the loss tangent at 60° C. (60° C. tan δ) of the rubber composition satisfying the above-described requirements, in a tire in which the tire cross-sectional width and the tire outer diameter satisfy the above-described requirements, when the height of the side part becomes low and local strain occurs, the deformation can be alleviated and the heat generation can be reduced, allowing for improvement in run flat performance. Moreover, since it becomes possible to reduce the heat generation due to the deformation of the side part even during normal running, it is considered that run flat durability and fuel efficiency can be improved with a good balance.

The rubber composition has a complex elastic modulus at 100° C. ($E^*_{100}$) of 5.0 MPa or more, preferably 5.5 MPa or more, more preferably 6.0 MPa or more, further preferably 6.5 MPa or more, further preferably 7.0 MPa or more, particularly preferably 7.5 MPa or more, under a condition of an initial strain of 10%, a dynamic strain of 1%, and a frequency of 10 Hz, from the viewpoint of steering stability. Moreover, $E^*_{100}$ is 17.0 MPa or less, preferably 16.0 MPa or less, more preferably 15.0 MPa or less, further preferably 14.0 MPa or less, further preferably 12.0 MPa or less, particularly preferably 11.0 MPa or less, from the viewpoint of strain mitigation.

The rubber composition has a 60° C. tan δ of 0.020 or more, preferably 0.022 or more, more preferably 0.025 or more, under a condition of an initial strain of 10%, a dynamic strain of 1%, and a frequency of 10 Hz, from the viewpoint of silence property. Moreover, 60° C. tan δ is 0.100 or less, preferably 0.095 or less, more preferably 0.090 or less, further preferably 0.075 or less, further preferably 0.065 or less, further preferably 0.055 or less, further preferably 0.049 or less, particularly preferably 0.044 or less, from the viewpoint of heat generation.

The rubber composition preferably comprises a rubber component comprising an isoprene-based rubber. A content of the isoprene-based rubber when compounded in 100% by mass of the rubber component is preferably 10% by mass or more, more preferably 15% by mass or more, further preferably 20% by mass or more, particularly preferably 25% by mass or more. Moreover, the content is preferably 80% by mass or less, more preferably 70% by mass or less, further preferably 60% by mass or less, particularly preferably 50% by mass or less.

The rubber composition preferably comprises 20 to 60 parts by mass of a reinforcing filler based on 100 parts by mass of the rubber component.

The rubber composition preferably comprises an organic cross-linking agent, more preferably comprises an organic cross-linking agent comprising a sulfur atom, further preferably comprises an alkylphenol-sulfur chloride condensate. A content of the organic cross-linking agent when compounded based on 100 parts by mass of the rubber component is preferably 1 part by mass or more, more preferably 2 parts by mass or more, further preferably 3 parts by mass or more. Moreover, the content is preferably 20 parts by mass or less, more preferably 15 parts by mass or less, further preferably 10 parts by mass or less.

In the run flat tire of the present disclosure, the ratio of the loss tangent at 60° C. (60° C. tan δ) of the rubber composition to the tire cross-sectional width Wt (mm) (60° C. tan δ/Wt) is preferably less than $4.5\times10^{-4}$, more preferably less than $4.0\times10^{-4}$, further preferably less than $3.5\times10^{-4}$. As the tire cross-sectional width Wt becomes smaller, the influence of heat generation due to deformation at the side part increases, but at the same time, by reducing 60° C. tan δ, it is considered that run flat durability and fuel efficiency can be improved with a good balance. Besides, a lower limit value of 60° C. tan δ/Wt is not particularly limited, but is preferably more than $1.0\times10^{-4}$.

Besides, in the present specification, the "tire cross-sectional width" is a maximum width between outer surfaces of sidewalls excluding, if any, patterns or characters on the side surface of the tire in a standardized state. The "tire outer diameter" is an outer diameter of a tire in a standardized state. Moreover, the "tire cross-sectional height" is a tire cross-sectional height in a standardized state, which is of ½ a difference between the tire outer diameter and a nominal rim diameter (mm) (tire outer diameter Dt (mm)−rim diameter (mm)).

A "standardized rim" is a rim defined for each tire in a standard system including a standard, on which the tire is based, by the standard, i.e., a "standard rim" in JATMA, "Design Rim" in TRA, or "Measuring Rim" in ETRTO. Besides, if a size of the tire is not specified in the above-described standard system, the standardized rim is a rim which can be assembled to the tire and whose width is narrowest among rims having the smallest diameter that does not cause air leakage between the rim and the tire.

A "standardized internal pressure" is an air pressure defined for each tire in a standard system including a standard on, which the tire is based, by the standard, i.e., a "maximum air pressure" in JATMA, a maximum value described in Table "TIRE LOAD LIMITS AT VARIOUS COLD INFLATION PRESSURES" in TRA, or "INFLATION PRESSURE" in ETRTO. Besides, if a size of the tire is not specified in the above-described standard system, the standardized internal pressure shall be 250 kPa.

The "standardized state" is a state where the tire is rim-assembled on a standardized rim, a standardized internal pressure is filled, and no load is applied. Besides, in the case of a tire having a size not specified in the above-described standard system, the standardized state is a state where the tire is rim-assembled on the minimum rim, 250 kPa is filled, and no load is applied.

A "standardized load" is a load defined for each tire in a standard system including a standard, on which the tire is based, by the standard, i.e., a "maximum load capacity" in JATMA, a maximum value described in Table "TIRE LOAD LIMITS AT VARIOUS COLD INFLATION PRESSURES" in TRA, or "LOAD CAPACITY" in ETRTO. Besides, in the case of a tire having a size not specified in the above-described standard system, a standardized load WL (kg) can be estimated by the following equation (4) and (5) where a cross-sectional width of the tire measured in the standardized state is defined as Wt (mm), a cross-sectional height of the tire measured in the standardized state is defined as H1 (mm), and an outer diameter of the tire measured in the standardized state is defined as Dt (mm).

$$V=\{(Dt/2)^2-(Dt/2-H1)^2\}\times\pi\times Wt \quad (4)$$

$$WL=0.000011\times V+175 \quad (5)$$

The "maximum load capacity" is a load capacity value (kg) when the maximum air pressure (kPa) corresponding to a tire having a load index (LI) is filled under usage conditions defined by the JATMA standard.

A procedure for producing the tire comprising a side reinforcing layer which is one embodiment of the present disclosure will be described in detail below. However, the following descriptions are illustrative for explaining the present disclosure, and are not intended to limit the technical scope of the present invention to this description range only. Besides, in the present specification, a numerical range identified with "to" means to include the numerical values of both ends.

<Rubber Component>

The rubber composition of the side reinforcing layer according to the present disclosure (hereinafter referred to as the rubber composition of the present disclosure) preferably comprises an isoprene-based rubber as a rubber component, more preferably comprises an isoprene-based rubber and a butadiene rubber (BR). Moreover, the rubber component may comprise an isoprene-based rubber, a butadiene rubber (BR), and a styrene-butadiene rubber (SBR).

(Isoprene-Based Rubber)

As an isoprene-based rubber, for example, those common in the tire industry can be used, such as an isoprene rubber (IR) and a natural rubber. Examples of the natural rubber includes a non-modified natural rubber (NR), as well as a modified natural rubber such as an epoxidized natural rubber (ENR), a hydrogenated natural rubber (HNR), a deproteinized natural rubber (DPNR), an ultra pure natural rubber, and a grafted natural rubber, and the like. These isoprene-based rubbers may be used alone, or two or more thereof may be used in combination.

The NR is not particularly limited, and those common in the tire industry can be used, examples of which include, for example, SIR20, RSS #3, TSR20, and the like.

A content of the isoprene-based rubber when compounded in 100% by mass of the rubber component is preferably 10% by mass or more, more preferably 15% by mass or more, further preferably 20% by mass or more, particularly preferably 25% by mass or more, from the viewpoint of complex elastic modulus. On the other hand, it is preferably 80% by mass or less, more preferably 70% by mass or less, further preferably 60% by mass or less, particularly preferably 50% by mass or less, from the viewpoint of securing damping property on a side part.

(SBR)

The SBR is not particularly limited, examples of which include a solution-polymerized SBR (S-SBR), an emulsion-polymerized SBR (E-SBR), modified SBRs (a modified S-SBR, a modified E-SBR) thereof, and the like. Examples of the modified SBR include a SBR modified at its terminal and/or main chain, a modified SBR coupled with tin, a silicon compound, etc. (a modified SBR of condensate or having a branched structure, etc.), and the like. Among them, a S-SBR and a modified SBR are preferable from the viewpoint that they can well improve fuel efficiency and abrasion resistance. Furthermore, hydrogenated additives of these SBRs (hydrogenated SBRs) and the like can also be used. These SBRs may be used alone, or two or more thereof may be used in combination.

Examples of the S-SBR that can be used in the present disclosure include S-SBRs manufactured and sold by JSR Corporation, Sumitomo Chemical Co., Ltd., Ube Industries, Ltd., Asahi Kasei Corporation, ZS Elastomer Co., Ltd., etc.

A styrene content of the SBR is preferably 15% by mass or more, more preferably 20% by mass or more, from the viewpoint of securing damping property on a side part. Moreover, it is preferably 60 parts by mass or less, more preferably 50 parts by mass or less, from the viewpoint of durability associated with heat generation. Besides, in the present specification, the styrene content of the SBR is calculated by $^1$H-NMR measurement.

A vinyl content of the SBR is preferably 10 mol % or more, more preferably 13 mol % or more, further preferably 16 mol % or more, from the viewpoints of ensuring reactivity with silica and rubber strength. Moreover, the vinyl content of the SBR is preferably 70 mol % or less, more preferably 65 mol % or less, further preferably 60 mol % or less, from the viewpoints of elongation at break and abrasion resistance. Besides, in the present specification, the vinyl content of the SBR (1,2-bond butadiene unit amount) is measured by infrared absorption spectrometry.

A weight-average molecular weight (Mw) of the SBR is preferably 150,000 or more, more preferably 200,000 or more, further preferably 250,000 or more, from the viewpoint of rubber strength. Moreover, the Mw is preferably 2,500,000 or less, more preferably 2,000,000 or less, from the viewpoint of processability. Besides, the Mw can be calculated in terms of a standard polystyrene based on measurement values obtained by a gel permeation chromatography (GPC) (GPC-8000 Series manufactured by Tosoh Corporation, detector differential refractometer, column: TSKGEL SUPERMULTIPORE HZ-M manufactured by Tosoh Corporation).

A content of the SBR when compounded in 100% by mass of the rubber component is preferably 5% by mass or more, more preferably 10% by mass or more, from the viewpoint of securing damping property on a side part. Moreover, it is preferably 50% by mass or less, more preferably 40% by mass or less, further preferably 30% by mass or less, particularly preferably 20% by mass or less, from the viewpoint of suppressing heat generation on the side part.

(BR)

The BR is not particularly limited, and those common in the tire industry can be used such as, for example, a BR having a cis content (cis-1,4 bond content) of less than 50% by mass (a low cis BR), a BR having a cis content of 90% by mass or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR). As these BRs, those commercially available from Ube Industries, Ltd., Sumitomo Chemical Co., Ltd., JSR Corporation, LANXESS, etc. can be used. These BRs may be used alone, or two or more thereof may be used in combination.

As the rare-earth-based BR, those commonly used in the tire industry can be used. As the rare-earth element-based catalyst used for synthesis (polymerization) of the rare-earth-based BR, a known one can be used, examples of which include catalysts including, for example, a lanthanum series rare-earth element compound, an organic aluminum compound, aluminoxane, a halogen-containing compound, and, if necessary, a Lewis base. Among them, a Nd-based catalyst using a neodymium (Nd)-containing compound as the lanthanum-series rare-earth element compound is preferable from the viewpoint of obtaining a BR having a high cis content and a low vinyl content.

Examples of the SPB-containing BR include those in which 1,2-syndiotactic polybutadiene crystal is chemically bonded with BR and dispersed, but not those in which the crystal is simply dispersed in the BR.

Examples of modified BRs include those obtained by adding a tin compound after polymerizing 1,3-butadiene by a lithium initiator, and further those in which the terminal of the modified BR molecule has tin-carbon bond (a tin-modified BR), a butadiene rubber (a modified BR for silica) having a condensed alkoxysilane compound at its active terminal, and the like.

A weight-average molecular weight (Mw) of the BR is preferably 300,000 or more, more preferably 350,000 or more, further preferably 400,000 or more, from the viewpoint of rubber strength. Moreover, the Mw is preferably 2,000,000 or less, more preferably 1,000,000 or less, from the viewpoint of processability. Besides, the Mw can be calculated in terms of a standard polystyrene based on measurement values obtained by a gel permeation chromatography (GPC) (GPC-8000 Series manufactured by Tosoh Corporation, detector: differential refractometer, column: TSKGEL SUPERMULTIPORE HZ-M manufactured by Tosoh Corporation).

A content of the BR when compounded in 100% by mass of the rubber component is preferably 20% by mass or more, more preferably 30% by mass or more, further preferably 40% by mass or more, particularly preferably 50% by mass or more, from the viewpoint of crack resistance. Moreover, it is preferably 80% by mass or less, more preferably 75% by mass or less, further preferably 70% by mass or less, particularly preferably 65% by mass or less, from the viewpoint of processability.

(Other Rubber Components)

As the rubber components according to the present disclosure, rubber components other than the above-described isoprene-based rubbers, SBRs, and BRs may be included. As other rubber components, cross-linkable rubber components commonly used in the tire industry can be used, such as, for example, a styrene-isoprene-butadiene copolymer rubber (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (IIR), an ethylene propylene rubber, a polynorbomene rubber, a silicone rubber, a polyethylene chloride rubber, a fluororubber (FKM), an acrylic rubber (ACM), a hydrin rubber, and the like. These other rubber components may be used alone, or two or more thereof may be used in combination.

(Reinforcing Filler)

The rubber composition of the present disclosure preferably comprises carbon black as a reinforcing filler, and may further comprise silica and other reinforcing fillers. The reinforcing filler may be a reinforcing filler consisting only of carbon black, or may be a reinforcing filler consisting only of carbon black and silica.

(Carbon Black)

Carbon black is not particularly limited, and those common in the tire industry can be used such as GPF, FEF, HAF, ISAF, and SAF, and specifically, N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, and the like can be appropriately used, and in-house synthesized products and the like can also be appropriately used. These carbon black may be used alone, or two or more thereof may be used in combination.

A nitrogen adsorption specific surface area ($N_2SA$) of carbon black is preferably 10 $m^2/g$ or more, more preferably 20 $m^2/g$ or more, further preferably 30 $m^2/g$ or more, from the viewpoints of weather resistance and reinforcing property. Moreover, it is preferably 250 $m^2/g$ or less, more preferably 200 $m^2/g$ or less, further preferably 150 $m^2/g$ or less, further preferably 90 $m^2/g$ or less, further preferably 70 $m^2/g$ or less, particularly preferably 50 $m^2/g$ or less, from the viewpoints of dispersibility and fuel efficiency. Besides, the $N_2SA$ of carbon black in the present specification is a value measured according to JIS K 6217-2: "Carbon black for rubber industry—Fundamental characteristics—Part 2: Determination of specific surface area—Nitrogen adsorption methods—Single-point procedures" A Method.

A content of carbon black when compounded based on 100 parts by mass of the rubber component is preferably 5 parts by mass or more, more preferably 10 parts by mass or more, further preferably 15 parts by mass or more, from the viewpoints of weather resistance and reinforcing property. Moreover, it is preferably 70 parts by mass or less, more preferably 60 parts by mass or less, further preferably 50 parts by mass or less, particularly preferably 40 parts by mass or less, from the viewpoint of suppressing heat generation on a side part.

(Silica)

Silica is not particularly limited, and those common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. These silicas may be used alone, or two or more thereof may be used in combination.

A nitrogen adsorption specific surface area ($N_2SA$) of silica is preferably 140 $m^2/g$ or more, more preferably 150 $m^2/g$ or more, further preferably 160 $m^2/g$ or more, particularly preferably 170 $m^2/g$ or more, from the viewpoint of securing reinforcing property and damping property on a sidewall part. Moreover, it is preferably 350 $m^2/g$ or less, more preferably 300 $m^2/g$ or less, further preferably 250 $m^2/g$ or less, from the viewpoints of heat generation and processability. Besides, the $N_2SA$ of silica in the present specification is a value measured by a BET method according to ASTM D3037-93.

An average primary particle size of silica is preferably 20 nm or less, more preferably 18 nm or less. A lower limit of the average primary particle size is, but not particularly limited to, preferably 1 nm or more, more preferably 3 nm or more, further preferably 5 nm or more. When the average primary particle size of silica is within the above-described ranges, silica dispersibility can be more improved, and reinforcing property, fracture characteristics, and abrasion resistance can be further improved. Besides, the average primary particle size of silica can be calculated by observing silica with a transmission or scanning electron microscope, measuring 400 or more primary particles of silica observed in the field of view, and averaging them.

A content of silica when compounded based on 100 parts by mass of the rubber component is preferably 5 parts by mass or more, more preferably 10 parts by mass or more, further preferably 15 parts by mass or more, from the viewpoint of securing damping property on a side part. Moreover, it is preferably 70 parts by mass or less, more preferably 60 parts by mass or less, further preferably 50 parts by mass or less, particularly preferably 40 parts by mass or less, from the viewpoints of reducing a specific weight of a rubber to reduce the weight and suppressing heat generation on a side part.

(Other Reinforcing Fillers)

As reinforcing fillers other than silica and carbon black, those commonly used in the tire industry can be compounded, such as aluminum hydroxide, calcium carbonate, alumina, clay, and talc.

A total content of reinforcing fillers based on 100 parts by mass of the rubber component is preferably 20 parts by mass or more, more preferably 25 parts by mass or more, further preferably 30 parts by mass or more, from the viewpoint of reinforcing property. Moreover, it is preferably 100 parts by mass or less, more preferably 80 parts by mass or less, further preferably 60 parts by mass or less, particularly preferably 50 parts by mass or less, from the viewpoint of suppressing heat generation on a side part.

(Silane Coupling Agent)

The silane coupling agent is not particularly limited, and a silane coupling agent conventionally used in combination with silica in the tire industry can be used, examples of which include, for example, silane coupling agents having mercapto groups described below; silane coupling agents having sulfide groups such as bis(3-triethoxysilylpropyl) disulfide and bis(3-trethoxysilylpropyl)tetrasulfide; silane coupling agents having vinyl groups such as vinyltriethoxysilane and vinyltrimethoxysilane; silane coupling agents having amino groups such as 3-aminopropyltriethoxysilane, 3-aminopropyltrimethoxysilane, and 3-(2-aminoethyl)aminopropyltriethoxysilane; glycidoxy-based silane coupling agents such as γ-glycidoxypropyltrethoxysilane and γ-glycidoxypropyltrimethoxysilane; nitro-based silane coupling agents such as 3-nitropropyltrimethoxysilane and 3-nitropropyltriethoxysilane; chloro-based silane coupling agents such as 3-chloropropyltrimethoxysilane and 3-chloropropyltriethoxy, and the like. Among them, silane coupling agents having sulfide groups and/or silane coupling agents having mercapto groups are preferable, and silane coupling agents having sulfide groups are more preferable. These silane coupling agents may be used alone, or two or more thereof may be used in combination.

It is preferable that the silane coupling agent having a mercapto group is a compound represented by the following formula (1) and/or a compound comprising a bond unit A represented by the following formula (2) and a bond unit B represented by the following formula (3).

(1)

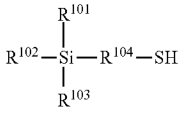

(wherein, $R^{101}$, $R^{102}$, and $R^{103}$ each independently represents a group represented by an alkyl having 1 to 12 carbon atoms, an alkoxy having 1 to 12 carbon atoms, or $-O-(R^{111}-O)_z-R^{112}$ ($R^{111}$s of z pieces each independently represents a divalent hydrocarbon group having 1 to 30 carbon atoms; $R^{112}$ represents an alkyl having 1 to 30 carbon atoms, an alkenyl having 2 to 30 carbon atoms, an aryl having 6 to 30 carbon atoms, or an aralkyl having 7 to 30 carbon atoms; and z represents an integer of 1 to 30); and $R^{104}$ represents an alkylene having 1 to 6 carbon atoms.)

(2)

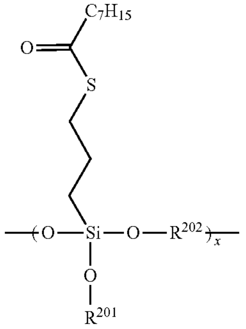

-continued (3)

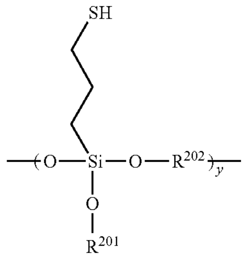

(wherein, x represents an integer of 0 or more; y represents an integer of 1 or more; $R^{201}$ represents hydrogen atom, or an alkyl having 1 to 30 carbon atoms, an alkenyl having 2 to 30 carbon atoms, or an alkynyl having 2 to 30 carbon atoms, each of the alkyl, the alkenyl and the alkynyl optionally being substituted with a halogen atom, hydroxyl, or carboxyl; and $R^{202}$ represents an alkylene having 1 to 30 carbon atoms, an alkenylene having 2 to 30 carbon atoms, or an alkynylene having 2 to 30 carbon atoms; and $R^{201}$ and $R^{202}$ may together form a ring structure.)

Examples of the compound represented by the formula (1) include, for example, 3-mercaptopropyltrmethoxysilane, 3-mercaptopropyltriethoxysilane, 2-mercaptoethyltrimethoxysilane, 2-mercaptoethyltriethoxysilane, a compound represented by the following formula (4) (Si363 manufactured by Evonik Degussa GmbH), and the like, and the compound represented by the following formula (4) can be appropriately used. They may be used alone, or two or more thereof may be used in combination.

(4)

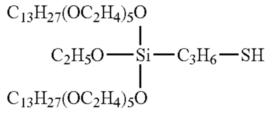

Examples of the compound comprising the bond unit A represented by the formula (2) and the bond unit B represented by the formula (3) include, for example, those manufactured and sold by Momentive Performance Materials, etc. They may be used alone, or two or more thereof may be used in combination.

A content of the silane coupling agent when compounded based on 100 parts by mass of silica is preferably 1.0 part by mass or more, more preferably 3.0 parts by mass or more, further preferably 5.0 parts by mass or more, from the viewpoint of enhancing dispersibility of silica. Moreover, it is preferably 30 parts by mass or less, more preferably 20 parts by mass or less, further preferably 15 parts by mass or less, from the viewpoint of preventing deterioration of abrasion resistance.

<Thermosetting Resin>

The rubber composition of the present disclosure may comprise a thermosetting resin for the purpose of obtaining good hardness and heat generation. The thermosetting resin is not particularly limited, examples of which include a cashew oil-modified phenol resin, a resorcinol resin, a modified resorcinol resin, a cresol resin, a modified cresol resin, and the like. Among them, a cashew oil-modified phenol resin is preferable. These thermosetting resins may be used alone, or two or more thereof may be used in combination. By compounding a thermosetting resin, a complex elastic modulus can be improved.

The cashew oil-modified phenol resin is resin obtained by modifying a phenol resin which is obtained by reacting phenol with aldehydes such as, for example, formaldehyde, acetaldehyde, and furfural with an acid or alkali catalyst using a cashew oil.

Examples of the resorcinol resin include, for example, a resorcinol-formaldehyde condensate. Examples of the modified resorcinol resin include, for example, those in which a part of a repeating unit of the resorcinol resin is alkylated.

Examples of the cresol resin include, for example, a cresol-formaldehyde condensate. Examples of the modified cresol resin include, for example, those in which a methyl group at the terminal of the cresol resin is modified to a hydroxyl group and those in which a part of a repeating unit of the cresol resin is alkylated.

A content of the thermosetting resin when compounded based on 100 parts by mass of the rubber component is preferably 5 parts by mass or more, more preferably 8 parts by mass or more, from the viewpoints of complex elastic modulus and run flat durability. Moreover, the content of the thermosetting resin is preferably 20 parts by mass or less, more preferably 10 parts by mass or less, from the viewpoints of fuel efficiency, elongation at break, processability (sheet rollability), and run flat durability.

A curing agent for curing the thermosetting resin is not particularly limited, examples of which include, for example, a partial condensate of hexamethylenetetramine, hexamethoxymethylmelamine, hexamethoxymethylol melamine, and hexamethylol melamine pentamethyl ether (HMMPME), and the like. By compounding a curing agent, hardness of the thermosetting resin can be further increased, and fuel efficiency can be improved. These curing agents may be used alone, or two or more thereof may be used in combination.

A content of the curing agent when compounded based on 100 parts by mass of the rubber component is preferably 1 part by mass or more, more preferably 2 parts by mass or more, further preferably 3 parts by mass or more, from the viewpoint of complex elastic modulus. Moreover, it is preferably 15 parts by mass or less, more preferably 10 parts by mass or less, further preferably 8 parts by mass or less, further preferably 6 parts by mass or less, particularly preferably 4 parts by mass or less, from the viewpoint of elongation at break.

(Other Compounding Agents)

The rubber composition of the present disclosure can appropriately comprise compounding agents conventionally and generally used in the tire industry, for example, oil, wax, resin components other than a thermosetting resin, processing aid, an antioxidant, stearic acid, zinc oxide, a vulcanizing agent, a vulcanization accelerator, and the like, in addition to the above-described components.

Examples of oil include, for example, process oil, vegetable fats and oils, animal fats and oils, and the like. Examples of the process oil include a paraffin-based process oil, a naphthene-based process oil, an aroma-based process oil, and the like. In addition, as an environmental measure, examples of the process oil include a process oil having a low content of a polycyclic aromatic (PCA) compound. Examples of the process oil having a low content of a PCA include Treated Distillate Aromatic Extract (TDAE) in which an oil aromatic process oil is re-extracted, an aroma substitute oil which is a mixture of asphalt and a naphthenic oil, mild extraction solvates (MES), a heavy naphthenic oil, and the like.

A content of oil when compounded based on 100 parts by mass of the rubber component is preferably 1 part by mass or more, more preferably 2 parts by mass or more, further preferably 3 parts by mass or more, from the viewpoint of processability. Moreover, it is preferably 25 parts by mass or less, more preferably 20 parts by mass or less, further preferably 15 parts by mass or less, particularly preferably 10 parts by mass or less, from the viewpoints of fuel efficiency and complex elastic modulus. A complex elastic modulus at 100° C. ($E^*_{100}$) can be adjusted by a compounding amount of oil. Besides, in the present specification, the content of oil also includes an amount of oil contained in an oil-extended rubber.

A content of stearic acid when compounded based on 100 parts by mass of the rubber component is preferably 0.5 parts by mass or more, more preferably 1 part by mass or more, from the viewpoint of processability. Moreover, it is preferably 10 parts by mass or less, more preferably 5 parts by mass or less, from the viewpoint of vulcanization rate.

A content of zinc oxide when compounded based on 100 parts by mass of the rubber component is preferably 0.5 parts by mass or more, more preferably 1 part by mass or more, from the viewpoint of processability. Moreover, it is preferably 10 parts by mass or less, more preferably 5 parts by mass or less, from the viewpoint of abrasion resistance.

Sulfur is appropriately used as a cross-linking agent. As sulfur, a powdery sulfur, oil a processing sulfur, a precipitated sulfur, a colloidal sulfur, an insoluble sulfur, a highly dispersible sulfur, and the like can be used.

A content of sulfur when compounded as a cross-linking agent based on 100 parts by mass of the rubber component is preferably 0.5 parts by mass or more, more preferably 1.0 part by mass or more, from the viewpoint of securing a sufficient vulcanization reaction. Moreover, it is preferably 7.0 parts by mass or less, more preferably 6.0 parts by mass or less, further preferably 5.0 parts by mass or less, from the viewpoint of preventing deterioration.

Examples of cross-linking agents other than sulfur include, for example, organic cross-linking agents comprising a sulfur atom such as TACKIROL V200 (alkylphenol-sulfur chloride condensate) manufactured by Taoka Chemical Co., Ltd., DURALINK HTS (sodium hexamethylene-1,6-bisthiosulfate dihydrate) manufactured by Flexsys, and KA9188 (1,6-bis(N,N'-dibenzylthiocarbamoyldithio) hexane) manufactured by LANXESS, organic peroxides such as dicumyl peroxide, and the like. Among them, organic cross-linking agents comprising a sulfur atom (particularly alkylphenol-sulfur chloride condensate) are appropriately used for lowering tan δ at 60° C.

A content of cross-linking agents other than sulfur when compounded based on 100 parts by mass of the rubber component is preferably 1 part by mass or more, more preferably 2 parts by mass or more, further preferably 3 parts by mass or more, from the viewpoint of securing a sufficient vulcanization reaction. Moreover, the content is preferably 20 parts by mass or less, more preferably 15 parts by mass or less, further preferably 10 parts by mass or less.

Examples of the vulcanization accelerator include, but not particularly limited to, for example, sulfenamide-based, thiazole-based, thiuram-based, thiourea-based, guanidine-based, dithiocarbamic acid-based, aldehyde-amine-based or aldehyde-ammonia-based, imidazoline-based, and xanthate-based vulcanization accelerators. Among them, sulfenamide-based vulcanization accelerators are preferable from the viewpoint that the desired effects can be obtained more appropriately. These vulcanization accelerators may be used alone, or two or more thereof may be used in combination.

Examples of the sulfenamide-based vulcanization accelerator include CBS (N-cyclohexyl-2-benzothiazolyl sulfenamide), TBBS (N-t-butyl-2-benzothiazolyl sulfenamide), N-oxyethylene-2-benzothiazolyl sulfenamide, N,N'-diisopropyl-2-benzothiazolyl sulfenamide, N,N-dicyclohexyl-2-benzothiazolyl sulfenamide, and the like. Among them, CBS or TBBS is preferable.

A content of the vulcanization accelerator when compounded based on 100 parts by mass of the rubber component is preferably 1 part by mass or more, more preferably 2 parts by mass or more. Moreover, the content is preferably 8 parts by mass or less, more preferably 7 parts by mass or less, further preferably 6 parts by mass or less.

The rubber composition of the present disclosure can be produced by a known method. For example, it can be produced by a method of kneading components other than vulcanizing agents and vulcanization accelerators, of the above-described components, with a known kneading machine used in the general tire industry such as a Banbury mixer, a kneader, and an open roll, then adding the vulcanizing agents and the vulcanization accelerators to the mixture to further knead them, and then vulcanizing them, and the like. For example, in the kneading step, kneading is performed at 80° C. to 170° C. for 1 to 30 minutes, and in the vulcanization step, vulcanization is performed at 130° C. to 190° C. for 3 to 20 minutes.

[Run Flat Tire]

The rubber composition of the present disclosure is used as a side reinforcing layer of a run flat tire. Here, the side reinforcing layer refers to a rubber layer arranged inside the sidewall part of the run flat tire, and the presence of the side reinforcing layer in the run flat tire allows for a vehicle to be supported even in a state where air pressure is lost, giving an excellent run flat durability.

FIG. 1 shows the right half of the cross-sectional view of the run flat tire according to the present disclosure. In addition, FIG. 1 is a schematic view in which some unnecessary configurations such as a band layer are omitted. In FIG. 1, a side reinforcing layer 8 is arranged over a bead part 7 to a shoulder part in contact with an inside of a tire carcass ply 3. Moreover, the side reinforcing layer 8 is arranged over the bead part 7 to a tread part 5 between a carcass ply body part and a folded part thereof or arranged in two layers between a plurality of carcass plies or reinforcing plies. The side reinforcing layer 8 is arranged in a substantially crescent shape where the thickness gradually decreases as the cross-sectional shape faces toward both ends in a vertical direction, but is not limited to this shape.

A tire comprising a side reinforcing layer formed of the above-described rubber composition can be produced by a usual method. That is, the tire can be produced by extruding an unvulcanized rubber composition compounded from the rubber component and other components as necessary into a shape of the side reinforcing layer 8, attaching it together with other tire members on a tire forming machine, and molding them by a usual method to form an unvulcanized tire, followed by heating and pressurizing this unvulcanized tire in a vulcanizing machine.

In FIG. 1, an arrow H1 indicates a height of a tire cross section formed by a baseline 10 and a center position of a tread surface. This baseline 10 passes through an innermost point of a bead core 6 in the tire radial direction. This baseline 10 extends in the tire axial direction.

A ratio of a height (mm) of a side reinforcing layer H2 to a tire cross-sectional height H1 (mm) (H2/H1) is, but not particularly limited to, preferably 30 to 90%, more preferably 40 to 80%.

Besides, the above-described tire cross-sectional height H1 and height of the side reinforcing layer H2 are heights in each tire radial direction in a standardized state, which can be measured by pressing a bead part of the tire simply cut out in the radial direction with a thickness of 2 to 4 cm according to a rim width.

EXAMPLE

Hereinafter, the present disclosure will be described based on Examples, though the present disclosure is not limited to these Examples.

Various chemicals used in Examples and Comparative examples are collectively shown below.

NR: TSR20

BR1: BR1250H manufactured by Zeon Corporation (tin-modified BR, polymerized using lithium as an initiator, cis-1,4 bond content: 40% by mass, Mw: 570,000)

BR2: BR730 manufactured by JSR Corporation (BR synthesized using a Nd-based catalyst, cis-1,4 bond content: 96.6% by mass, Mw: 580,000)

SBR: SBR1502 manufactured by JSR Corporation (E-SBR, styrene content: 23.5% by mass, vinyl content: 18 mol %, Mw: 420,000)

Carbon black: Show Black N550 manufactured by Cabot Japan K.K. ($N_2SA$: 42 $m^2/g$, DBP: 113 mL/g)

Silica: Ultrasil (Registered Trademark) VN3 manufactured by Evonik Degussa GmbH ($N_2SA$: 175 $m^2/g$, average primary particle size: 17 nm)

Silane coupling agent: Si75 manufactured by Evonik Degussa GmbH (bis(3-triethoxysilylpropyl)disulfide)

Oil: Diana Process AH-24 manufactured by Idemitsu Kosan Co., Ltd.

Thermosetting resin: PR12686 manufactured by Sumitomo Bakelite Co., Ltd. (cashew oil-modified phenol resin, softening point: 100° C.)

Curing agent: SUMIKANOL 507AP manufactured by Taoka Chemical Co., Ltd. (comprising a total amount of 35% by mass of a modified etherified methylolmelamine resin (a partial condensate of hexamethylolmelamine pentamethyl ether (HMMPME)), silica and oil)

Zinc oxide: Zinc oxide No. 1 manufactured by Mitsui Mining & Smelting Co., Ltd.

Stearic acid: Bead stearic acid "CAMELLIA" manufactured by NOF CORPORATION

Sulfur: Seimi sulfer manufactured by Nippon Kanryu Industry Co., Ltd. (insoluble sulfur having 60% or more of insoluble matter derived from carbon disulfide, oil content: 5% by mass, values in Table 1 are amounts of pure sulfur)

Organic cross-linking agent: TACKIROL V200 manufactured by Taoka Chemical Co., Ltd. (alkylphenol-sulfur chloride condensate)

Vulcanization accelerator: Sanceler NS-G manufactured by Sanshin Chemical Industry Co., Ltd. (N-(tert-butyl)-2-benzothiazolylsulfenamide (TBBS))

EXAMPLES AND COMPARATIVE EXAMPLES

According to the compounding formulations shown in Table 1, using a 1.7 L closed Banbury mixer, all chemicals other than sulfur and vulcanization accelerators were kneaded until reaching a discharge temperature at 150° C. to 160° C. for 1 to 10 minutes to obtain a kneaded product. Next, using a twin-screw open roll, sulfur and vulcanization accelerators were added to the obtained kneaded product, and the mixture was kneaded for 4 minutes until the temperature reached 105° C. to obtain an unvulcanized rubber composition.

An unvulcanized rubber composition compounded as shown in Table 1 was extruded into a shape of a side reinforcing layer with an extruder equipped with a mouthpiece having a predetermined shape and attached together with other tire members, forming an unvulcanized tire, and the unvulcanized tire was press-vulcanized under a condition of 170° C. for 12 minutes to produce and prepare test tires 1-6 having tire sizes, tire cross-sectional widths, and tire outer diameters shown in Table 2, respectively.

The obtained test tires were evaluated as follows. The evaluation results are shown in Table 1.

<Measurement of Complex Elastic Modulus E* and Loss Tangent Tan δ of Side Reinforcing Layer>

From a side reinforcing layer of each test tire, a part in the vicinity of the central part of the height and width of the tire was collected in a cross-sectional view of the tire to cut out a viscoelasticity measurement sample so as to have a width of 4 mm, a thickness of 2 mm, and a length of 40 mm. Besides, a length direction here is a tire circumferential direction, and a width direction and a thickness direction can be arbitrarily determined with respect to a width direction and a height direction of a tire. For each of the obtained samples, a loss tangent tan δ was measured under a condition of 60° C., an initial strain of 10%, a dynamic strain of 1%, and a frequency of 10 Hz using EPLEXOR (Registered Trademark) manufactured by gabo Systemtechnik GmbH. Moreover, for each of the obtained samples, a complex elastic modulus E* was measured under a condition of 100° C., an initial strain of 10%, a dynamic strain of 1%, and a frequency of 10 Hz. Besides, for each tire, a viscoelasticity was measured on both side parts in the tire width direction, and the viscoelasticity values shown in Table 1 are average values of results measured on both side parts of each test tire.

<Run Flat Durability>

A tire was incorporated into a rim and left at an internal pressure of 250 kPa for 3 hours to measure a dimension of the tire. In the test, under a condition of 25° C.±3° C., with a valve core of the rim removed, where a load of 3.62N was applied to the test tires 1 to 3 and a load of 6.60N was applied to the test tires 4 to 6, the tires were run on a φ2.0 m drum at a speed of 80 km/h. When a displacement rate of the tire height during running exceeds 20% or smoke is generated from the tire, the tire was considered to be damaged, and a running time up to that point was indicated as an index with the reference Comparative example (Comparative example 1 in Tables 3 and 4 or Comparative example 9 in Tables 5 and 6) being as 100. The results show that the larger the index is, the better the run flat durability is.

<Fuel Efficiency>

For the test tires 1 to 3, with the maximum load capacity being 615 kg, and for the test tires 4 to 6, with the maximum load capacity being 1120 kg, in accordance with JIS D 4234: 2009 for the other conditions, a rolling resistance coefficient of each test tire was measured. An inverse value of the rolling resistance coefficient was indicated as an index with the reference Comparative example (Comparative example 1 in Tables 3 and 4 or Comparative example 9 in Tables 5 and 6) being as 100. The results show that the larger the index is, the smaller the rolling resistance is and the better the fuel efficiency is.

TABLE 1

| | Compounding of side reinforcing layer | | | | | | | | | | | | |
|---|---|---|---|---|---|---|---|---|---|---|---|---|---|
| | A | B | C | D | E | F | G | H | I | J | K | L | M |
| | Compounding amount (part by mass) | | | | | | | | | | | | |
| NR | 80 | 30 | 100 | 40 | 40 | 40 | 20 | 40 | 40 | 40 | 40 | 40 | 40 |
| BR1 | — | 70 | — | 60 | 60 | 60 | 60 | 60 | 60 | 60 | — | 60 | 60 |
| BR2 | — | — | — | — | — | — | — | — | — | — | 60 | — | — |
| SBR | 20 | — | — | — | — | — | 20 | — | — | — | — | — | — |
| Carbon black | 70 | 50 | 50 | 45 | 40 | 40 | 40 | 40 | 38 | 38 | 40 | 25 | 38 |
| Silica | — | — | — | — | — | — | — | — | — | — | — | 15 | — |
| Silane coupling agent | — | — | — | — | — | — | — | — | — | — | — | 1.5 | — |
| Oil | 2.0 | 2.0 | 2.0 | 2.0 | 2.0 | — | 7.0 | 2.0 | 2.0 | — | 2.0 | 2.0 | 2.0 |
| Thermosetting resin | — | — | — | — | — | — | — | — | — | — | — | — | 5.0 |
| Curing agent | — | — | — | — | — | — | — | — | — | — | — | — | 1.0 |
| Zinc oxide | 3.0 | 5.0 | 7.0 | 7.0 | 7.0 | 7.0 | 7.0 | 7.0 | 7.0 | 7.0 | 7.0 | 7.0 | 7.0 |
| Stearic acid | 2.0 | 3.0 | 2.0 | 3.0 | 3.0 | 3.0 | 3.0 | 3.0 | 3.0 | 3.0 | 3.0 | 3.0 | 3.0 |
| Sulfur | 2.0 | 5.0 | 5.0 | 5.0 | 5.0 | 5.0 | 5.0 | 5.0 | 5.0 | 5.0 | 5.0 | 5.0 | 5.0 |
| Organic cross-linking agent | — | 2.0 | — | — | — | 5.0 | — | 5.0 | 8.0 | 8.0 | 5.0 | 5.0 | 5.0 |
| Vulcanization accelerator | 1.0 | 2.0 | 2.0 | 2.0 | 2.5 | 2.0 | 3.0 | 2.0 | 2.0 | 2.0 | 2.0 | 2.0 | 2.0 |
| tan δ (60° C.) | 0.120 | 0.055 | 0.055 | 0.095 | 0.090 | 0.050 | 0.070 | 0.052 | 0.025 | 0.025 | 0.040 | 0.032 | 0.038 |
| $E^*_{100}$ (MPa) | 20.5 | 18.8 | 4.5 | 9.9 | 12.0 | 15.0 | 6.0 | 8.9 | 8.4 | 10.2 | 9.5 | 9.1 | 11.0 |

TABLE 2

| | Tire | | | | | |
|---|---|---|---|---|---|---|
| | 1 | 2 | 3 | 4 | 5 | 6 |
| Tire size | 195/65R15 91H | 125/65R19 | 195/65R17 | 285/45R20 112Y | 225/45R22 | 285/45R22 |

TABLE 2-continued

| | Tire | | | | | |
|---|---|---|---|---|---|---|
| | 1 | 2 | 3 | 4 | 5 | 6 |
| Tire cross-sectional width Wt (mm) | 195 | 125 | 195 | 285 | 225 | 285 |
| Tire outer diameter Dt (mm) | 634.5 | 645.1 | 685.3 | 764.5 | 761.3 | 815.3 |

TABLE 3

| | Example | | | | | |
|---|---|---|---|---|---|---|
| | 1 | 2 | 3 | 4 | 5 | 6 |
| Compounding of side reinforcing layer | Compounding E | Compounding F | Compounding G | Compounding H | Compounding I | Compounding H |
| Tire | Tire 2 | Tire 2 | Tire 2 | Tire 3 | Tire 3 | Tire 2 |
| Index | | | | | | |
| Run flat durability | 100 | 105 | 110 | 120 | 120 | 120 |
| Fuel efficiency | 105 | 110 | 108 | 115 | 120 | 117 |
| | Example | | | | | |
| | 7 | 8 | 9 | 10 | 11 | 12 |
| Compounding of side reinforcing layer | Compounding I | Compounding J | Compounding D | Compounding K | Compounding L | Compounding M |
| Tire | Tire 2 | Tire 2 | Tire 2 | Tire 2 | Tire 2 | Tire 2 |
| Index | | | | | | |
| Run flat durability | 130 | 135 | 98 | 125 | 128 | 126 |
| Fuel efficiency | 125 | 130 | 105 | 123 | 125 | 125 |

TABLE 4

| | Comparative example | | | |
|---|---|---|---|---|
| | 1 | 2 | 3 | 4 |
| Compounding of side reinforcing layer | Compounding A | Compounding A | Compounding B | Compounding C |
| Tire | Tire 1 | Tire 2 | Tire 2 | Tire 2 |
| Index | | | | |
| Run flat durability | 100 | 65 | 70 | 50 |
| Fuel efficiency | 100 | 105 | 110 | 115 |
| | Comparative example | | | |
| | 5 | 6 | 7 | 8 |
| Compounding of side reinforcing layer | Compounding A | Compounding B | Compounding C | Compounding E |
| Tire | Tire 3 | Tire 3 | Tire 3 | Tire 1 |
| Index | | | | |
| Run flat durability | 85 | 90 | 75 | 90 |
| Fuel efficiency | 80 | 95 | 100 | 110 |

TABLE 5

| | Example | | | | | |
|---|---|---|---|---|---|---|
| | 13 | 14 | 15 | 16 | 17 | 18 |
| Compounding of side reinforcing layer | Compounding E | Compounding F | Compounding G | Compounding H | Compounding I | Compounding H |
| Tire | Tire 5 | Tire 5 | Tire 5 | Tire 6 | Tire 6 | Tire 5 |
| Index | | | | | | |
| Run flat durability | 100 | 115 | 108 | 120 | 123 | 125 |
| Fuel efficiency | 105 | 110 | 105 | 115 | 120 | 115 |

| | Example | | | | | |
|---|---|---|---|---|---|---|
| | 19 | 20 | 21 | 22 | 23 | 24 |
| Compounding of side reinforcing layer | Compounding I | Compounding J | Compounding D | Compounding K | Compounding L | Compounding M |
| Tire | Tire 5 | Tire 5 | Tire 5 | Tire 5 | Tire 5 | Tire 5 |
| Index | | | | | | |
| Run flat durability | 133 | 140 | 102 | 128 | 132 | 130 |
| Fuel efficiency | 121 | 128 | 107 | 118 | 120 | 120 |

TABLE 6

| | Comparative example | | | |
|---|---|---|---|---|
| | 9 | 10 | 11 | 12 |
| Compounding of side reinforcing layer | Compounding A | Compounding A | Compounding B | Compounding C |
| Tire | Tire 4 | Tire 5 | Tire 5 | Tire 5 |
| Index | | | | |
| Run flat durability | 100 | 55 | 65 | 50 |
| Fuel efficiency | 100 | 105 | 110 | 113 |

| | Comparative example | | | |
|---|---|---|---|---|
| | 13 | 14 | 15 | 16 |
| Compounding of side reinforcing layer | Compounding A | Compounding B | Compounding C | Compounding E |
| Tire | Tire 6 | Tire 6 | Tire 6 | Tire 4 |
| Index | | | | |
| Run flat durability | 75 | 80 | 75 | 88 |
| Fuel efficiency | 70 | 90 | 95 | 109 |

From the results in Tables 1 to 6, it can be found that the run flat tire of the present disclosure, in which a cross-sectional width and an outer diameter of the tire satisfy predetermined requirements and viscoelasticity of a side reinforcing layer provided in a sidewall part is subjected under a specific condition, has improved run flat durability and fuel efficiency with a good balance.

EXPLANATION OF NUMERALS

1. Run flat tire
3. Carcass ply
5. Tread part
6. Bead core
7. Bead part
8. Side reinforcing layer
10. Baseline
H1. Tire cross-sectional height
H2. Height of side reinforcing layer

The invention claimed is:

1. A run flat tire comprising a side reinforcing layer on a sidewall part, wherein the side reinforcing layer comprises a rubber composition comprising a rubber component, wherein the rubber composition of the side reinforcing layer has a complex elastic modulus at 100° C. ($E^*_{100}$) of 5.0 to 17.0 MPa and a loss tangent at 60° C. (60° C. tan δ) of 0.020 to 0.100, wherein a ratio of the loss tangent at 60° C. (60° C. tan δ) of the rubber composition to a tire cross-sectional width Wt in mm (60° C. tan δ/Wt) is less than $4.5\times10^{-4}$, wherein the 60° C. tan δ of the rubber composition is 0.025 to 0.049, and wherein, where a tire outer diameter is defined as Dt in mm, Wt and Dt satisfy any of the following inequalities:

$$Wt<225 \text{ and } Dt\geq 59.078\times Wt\hat{}0.460$$

$$225\leq Wt<235 \text{ and } Dt\geq 59.078\times Wt\hat{}0.620-967.673$$

$$235\leq Wt \text{ and } Dt\geq Wt\hat{}0.6+750.$$

2. The run flat tire of claim 1, wherein Wt is 195 mm or more.

3. The run flat tire of claim 1, wherein the $E^*_{100}$ of the rubber composition is 7.0 to 15.0 MPa.

4. The run flat tire of claim 1, wherein the side reinforcing layer is arranged in a substantially crescent shape where the thickness gradually decreases as the cross-sectional shape faces toward both ends in a vertical direction.

* * * * *